(No Model.)
C. E. CHINNOCK.
SUSPENDING CABLES OR CONDUCTORS.
No. 274,562. Patented Mar. 27, 1883.
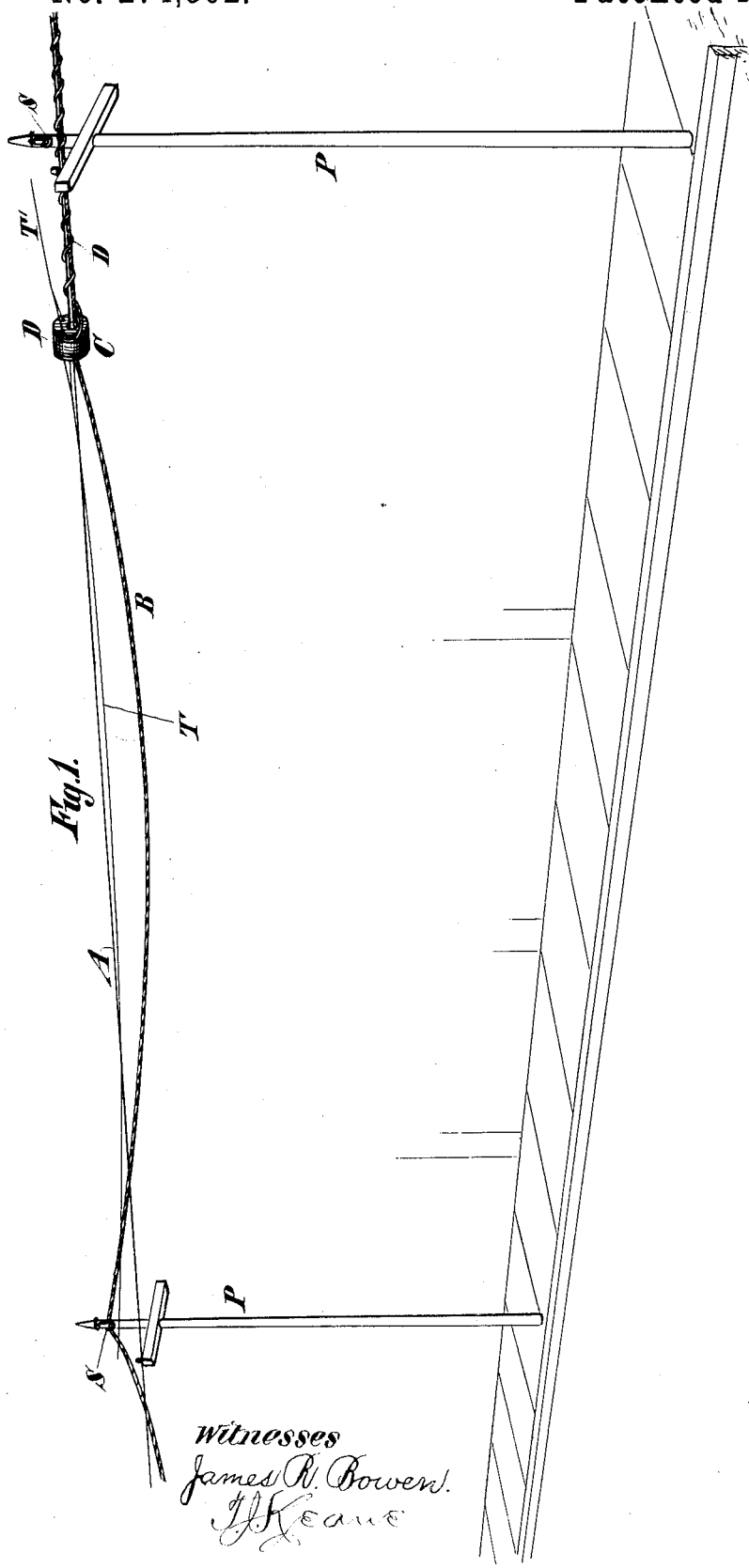
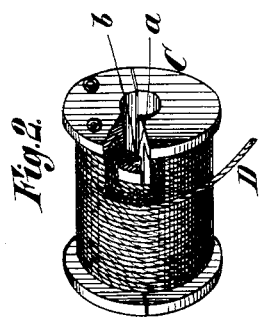
Witnesses
James R. Bowen.
J. J. Keane
Inventor
C. E. Chinnock
by his atty,
Edwin H. Brown

UNITED STATES PATENT OFFICE.

CHARLES E. CHINNOCK, OF BROOKLYN, NEW YORK.

SUSPENDING CABLES OR CONDUCTORS.

SPECIFICATION forming part of Letters Patent No. 274,562, dated March 27, 1883.

Application filed October 9, 1882. (No model.)

*To all whom it may concern:*

Be it known that I, CHARLES E. CHINNOCK, of Brooklyn, in Kings county, and State of New York, have invented a certain Improvement in Suspending Cables or Conductors, of which the following is a specification.

The object of my improvement is to provide for suspending cables or conductors with little slack and without exerting any severe longitudinal strain upon them.

The improvement consists, first, in running a strong wire from one support to another and drawing it taut; secondly, in hanging the cable or conductor in loose festoons therefrom; thirdly, in placing over the wire and cable or conductor a clamp for holding them together; and, fourthly, in moving this clamp and applying tarred marline or other suitable material in rear of it, in the form of a spiral or coil, around the wire and cable or conductor.

In the accompanying drawings, Figure 1 is a perspective view of a cable or conductor, supports therefor, and other devices, illustrating my improvement; and Fig. 2 is a sectional perspective view of a clamp used in carrying out the improvement.

Similar letters of reference designate corresponding parts in both figures.

In carrying out my invention I first run a wire, A, of steel or other suitable metal, from one pole P or support to another pole P or support in the usual manner, and draw it taut. The cable or conductor B to be suspended is then run through snatch-blocks S, temporarily arranged on the poles P. The cable or conductor B is not drawn taut, and hence it hangs in festoons from the snatch-blocks. I then apply to the wire A and cable or conductor B, a spool or reel, C. This spool or reel is made in longitudinal sections, so that it can be placed over the wire A and cable or conductor B at any portion of the length thereof. It may be provided with any suitable catches or fastenings for securing its parts together when they are in place; but these will not be necessary, as I wind on it a material, D, which is to be coiled around the said wire and conductor or cable, and this material may serve to secure the parts together. The parts of this spool or reel may have their proper relations preserved by means of spurs and recesses $a\ b$. The material D is preferably tarred marline or spun yarn, as this is well adapted to stand the weather, and will not, because of its adhesive or frictional nature, too readily unwind from the spool or reel. The spool or reel is placed over the wire A and cable or conductor B, near one pole or support, and the tarred marline or other material, D, is wound upon it. The outer end of the tarred marline or other material is then held or is fastened to the adjacent pole or support. Subsequently the spool or reel is drawn toward the next support, and as it moves along the coils of the tarred marline or other material, D, slips off around the wire A and cable or conductor B and secures the two together by forming a spiral of rapid pitch around them. The spool or reel, traveling in advance of the spiral thus laid around the wire A and cable or conductor B, raises the latter into proximity with the said wire A, and hence the spiral has not to do the work of raising it, but merely of securing it when raised. It is obvious that in this way the slack may be taken out of the cable or conductor without exerting any severe strain upon it longitudinally, and that it will be afforded a uniform support. When the next pole or support is reached the end of the tarred marline is made fast. The wire A, if not already carried farther, is taken to a third pole or support and drawn taut, and the cable or conductor is secured to it as before.

The snatch-blocks S are pulley-blocks having one side pivoted, so that it can be swung aside to permit the blocks to be placed sidewise upon or over the cable or conductor B.

The spool or reel C may be of any size suitable for carrying an amount of tarred marline or other material, D, from one pole or support to another, or even farther. Generally it will suffice if it is about fifteen inches long and three inches in diameter. The tarred marline or other material, D, may be wound on the spool or reel C by turning the latter. The ends of the tarred marline or other material, D, may be fastened to the poles or supports, or to each other.

While I do not wish to confine this invention to the suspending of any particular cable, it is especially applicable to a cable which I have heretofore patented, comprising a number of conductive wires coated with an insulating material, and having metal or any other conductive substance applied to the exterior of the insulating material.

I do not wish to be confined to laying the tarred marline or other material, D, directly upon the exterior of the spool or reel, as I may use a cylindrical clamp to hold the cable or conductor to the wire A, and provide the clamp with a bobbin arranged parallel with or transverse to its axis, and containing the tarred marline or other material. In such case the bobbin will have to be revolved as it is moved along to apply the tarred marline or other material in a spiral or coil.

The spool or reel C may be moved along, when laying the tarred marline or other material, D, by means of a cord, T. Preferably this cord will be attached at two points, so as to prevent the spool or reel from twisting. A cord, T', will also be attached to the rear end of the spool or reel, so as to provide for drawing it back when necessary.

What I claim as my invention, and desire to secure by Letters Patent, is—

The process of suspending a cable or conductor, consisting, first, in running a wire of steel or other suitable material from one support to another and drawing it taut; secondly, in hanging the cable or conductor in loose festoons therefrom; thirdly, in placing over the wire and cable or conductor a clamp for holding them together; and, fourthly, in moving this clamp along and applying tarred marline or other suitable material in rear of it, in the form of a spiral or coil, around the wire and cable or conductor, substantially as specified.

C. E. CHINNOCK.

Witnesses:
FREDK. HAYNES,
ED. L. MORAN.